United States Patent Office.

PETER J. STOUFFER, OF UNIONTOWN, PENNSYLVANIA, ASSIGNOR TO HIMSELF AND HENRY WHITE.

Letters Patent No. 64,047, dated April 23, 1867.

IMPROVED COMPOSITION FOR PRESERVING EGGS.

*The Schedule referred to in these Letters Patent and making part of the same.*

TO ALL WHOM IT MAY CONCERN:

Be it known that I, PETER J. STOUFFER, of Uniontown, Fayette county, and State of Pennsylvania, have invented a new Composition for Preserving Eggs; and I do hereby declare that the following is a full and exact description thereof.

The nature of my invention consists in a compound for preserving eggs, produced by the admixture of the several ingredients contained therein in the proportions and manner described in the use thereof, all as fully set forth herein.

To enable others to make and use my invention, I will proceed to describe its preparation and use.

Take eight pounds chloride of sodium, five pounds of Louisville lime, one-half pound charcoal, one-half pound nitras potassi, one-half pound alum, five ounces sulphuret of iron, six ounces gum arabic, and twenty-two gallons of water. The quantities given are sufficient to produce about twenty-two gallons of the mixture, the amount required to preserve an ordinary barrel full of eggs.

To prepare the compound, take a well-hooped, water-tight barrel, take out one head, put the charcoal in a tight sack and nail it to the bottom or side of the barrel. The charcoal should be in coarse lumps the size of a hazel-nut. Then put in the lime, chloride of sodium, nitras potassi, alum, sulphuret of iron, and gum arabic, well pulverized, and add the water. Let it stand a day or two, stirring occasionally, when it will be fit for use. Fill the barrel, say within three inches of the top, with eggs, leaving not less than two inches of the fluid over the top of the eggs, cover the top of the barrel loosely and set it away. After it has stood for a time there will be a heavy scum formed on the surface almost the eighth of an inch thick. Even after the eggs have been in six months they will be as clear and fresh as when first put in; always keeping them well covered with the fluid. Thus eggs can be put up when plenty and cheap, and preserved for use or sale when they are scarce and dear.

This composition has been tested for years by the inventor, and has proved highly satisfactory. The ingredients are cheap, easily procured, and the solution readily prepared, thus fulfilling the requisites of a practical and useful preservative of eggs, and within the reach and means of all. In practice there will be of course a certain latitude of variation in the proportions of the ingredients composing this compound, and beneficial results still be realized in degree. I do not, therefore, confine myself to the precise proportions stated, but consider them the most perfect and effective. The strength of the materials may vary so as to render a corresponding variation of the proportions even desirable; but the proportions given, as a general rule, are the best.

Having now described my invention, and the manner of compounding and using it, what I claim, and desire to secure by Letters Patent, is—

The composition for preserving eggs, substantially as set forth.

PETER J. STOUFFER.

Witnesses:
 JOHN CARY,
 MARSHALL N. LEWIS.